US007482789B2

(12) United States Patent
Motomori et al.

(10) Patent No.: US 7,482,789 B2
(45) Date of Patent: Jan. 27, 2009

(54) STEP-UP CONVERTER

(75) Inventors: Mikio Motomori, Osaka (JP); Takuya Ishii, Osaka (JP); Takashi Ryu, Kyoto (JP); Hiroki Akashi, Osaka (JP); Hirohisa Tanabe, Kyoto (JP); Makoto Ishimaru, Osaka (JP); Tomoya Shigemi, Osaka (JP)

(73) Assignee: Panasonic Corporation, Osaka (JP)

( * ) Notice: Subject to any disclaimer, the term of this patent is extended or adjusted under 35 U.S.C. 154(b) by 87 days.

(21) Appl. No.: 11/414,373

(22) Filed: May 1, 2006

(65) Prior Publication Data
US 2006/0255774 A1 Nov. 16, 2006

(30) Foreign Application Priority Data
May 10, 2005 (JP) ............................. 2005-137206

(51) Int. Cl.
G05F 1/62 (2006.01)
(52) U.S. Cl. ........................................ 323/224; 323/222
(58) Field of Classification Search ................. 323/222, 323/223, 259, 266, 280, 281, 282, 283, 284, 323/286, 288; 363/21.01, 21.02, 21.05, 48, 363/51, 52, 53, 76; 327/541
See application file for complete search history.

(56) References Cited

U.S. PATENT DOCUMENTS

| | | | | | |
|---|---|---|---|---|---|
| 4,967,138 | A | * | 10/1990 | Obergfell et al. | 323/224 |
| 5,134,355 | A | * | 7/1992 | Hastings | 323/211 |
| 5,350,997 | A | * | 9/1994 | Ghotbi et al. | 323/268 |
| 5,359,276 | A | * | 10/1994 | Mammano | 323/207 |
| 5,818,707 | A | * | 10/1998 | Seong et al. | 363/89 |
| 6,087,816 | A | * | 7/2000 | Volk | 323/282 |
| 6,091,232 | A | * | 7/2000 | Criscione et al. | 323/222 |
| 6,094,036 | A | * | 7/2000 | Rampold | 323/266 |
| 6,166,526 | A | * | 12/2000 | Greitschus | 323/222 |
| 6,222,356 | B1 | * | 4/2001 | Taghizadeh-Kaschani | 323/288 |

(Continued)

FOREIGN PATENT DOCUMENTS

JP    7-44836    5/1995

(Continued)

OTHER PUBLICATIONS

Japanese Notice of Reasons for Rejection, w/ English translation thereof, issued in Japanese Patent Application No. 2005-137206 dated on Sep. 30, 2008.

Primary Examiner—Akm E Ullah
Assistant Examiner—M'Baye Diao
(74) Attorney, Agent, or Firm—McDermott Will & Emery LLP

(57) ABSTRACT

A step-up converter includes an inductor which receives input voltage Vi at one end, a first FET of the first conduction type which functions as a switch for determining whether or not energy is accumulated in the inductor, a second FET of the second conduction type which rectifies a current output from the other end of the inductor, an output capacitor having an end connected to the source of the second FET, a current detection circuit, and a feedback control circuit. The current detection circuit detects a current flowing through the first N-channel FET to output current detection signal Vc. The feedback control circuit controls the operations of the first N-channel FET and a P-channel FET based on current detection signal Vc.

10 Claims, 6 Drawing Sheets

U.S. PATENT DOCUMENTS

| | | | |
|---|---|---|---|
| 6,304,068 B1* | 10/2001 | Hui et al. | 323/288 |
| 6,310,466 B1* | 10/2001 | Criscione | 323/222 |
| 6,927,556 B2* | 8/2005 | Hosotani et al. | 323/222 |
| 7,135,845 B2* | 11/2006 | Zverev et al. | 323/284 |
| 2002/0036487 A1* | 3/2002 | Moriconi et al. | 323/288 |
| 2003/0111989 A1* | 6/2003 | Kranz | 323/283 |
| 2003/0141857 A1* | 7/2003 | Nishida et al. | 323/282 |
| 2003/0210025 A1* | 11/2003 | Ishii et al. | 323/284 |
| 2003/0227279 A1* | 12/2003 | Feldtkeller | 323/222 |
| 2004/0119452 A1* | 6/2004 | Florence et al. | 323/282 |
| 2004/0227496 A1* | 11/2004 | Hosotani et al. | 323/282 |
| 2005/0104565 A1* | 5/2005 | Nagaoka et al. | 323/222 |
| 2006/0113976 A1* | 6/2006 | Bernardon | 323/282 |
| 2006/0176029 A1* | 8/2006 | McGinty et al. | 323/222 |
| 2007/0211498 A1* | 9/2007 | Van Casteren | 363/16 |

FOREIGN PATENT DOCUMENTS

| | | |
|---|---|---|
| JP | 10-225104 | 8/1998 |
| JP | 2000-287439 | 10/2000 |
| JP | 2003-070243 | 3/2003 |
| JP | 2004-236391 | 8/2004 |
| WO | WO 85/01161 | 3/1985 |

\* cited by examiner

STEP-UP CONVERTER

BACKGROUND OF THE INVENTION

1. Field of the Invention

The present invention relates to a DC-DC converter of a step-up type for boosting a DC voltage.

2. Description of the Prior Art

To generate a voltage greater than the voltage supplied from a power supply, such as a battery, or the like, and supply a voltage for driving a light emitting device or liquid crystal display device, a step-up converter having high power conversion efficiency has been used. The step-up converter mainly formed by an inductor, a switch, a rectifier and a smoother. In such a step-up converter, when the switch is ON, an input voltage is applied to the inductor so that the inductor is excited. When the switch is OFF, a current flows from the inductor to the smoother through the rectifier. Then, an increased DC voltage is supplied from the smoother to a load.

FIG. 6 is a circuit diagram showing a conventional step-up converter. The step-up converter shown in FIG. 6 is described in Japanese Laid-Open Patent Publication No. 10-225104, and the structure and operation of this step-up converter are described below.

The conventional step-up converter shown in FIG. 6 includes an inductor 121, an N-channel FET 122, a diode 123, a P-channel FET 125, an output capacitor 124, and a control circuit 126. The inductor 121 receives input voltage Vi at one end. The N-channel FET 122 has a source connected to the ground and a drain connected to the other end of the inductor 121 and serves as a switch. The diode 123 rectifies a current output from the other end of the inductor 121. The P-channel FET 125 has a drain connected to the other end of the inductor 121 and an anode of the diode 123 and a source connected to a cathode of the diode 123. One end of the output capacitor 124 is connected to the cathode of the diode 123 and the source of the P-channel FET 125, and the other end of the output capacitor 124 is connected to the ground. The output capacitor 124 serves as a smoother. The control circuit 126 controls the operation of the gate electrode of the N-channel FET 122 and the operation of the gate electrode of the P-channel FET 125. The control circuit 126 supplies pulse PA to the gate electrode of the N-channel FET 122 and pulse PB to the gate electrode of the P-channel FET 125. The output capacitor 124 outputs output voltage Vo. Output voltage Vo is input to the control circuit 126.

The control circuit 126 controls pulses PA and PB such that output voltage Vo equals a desired value. Specifically, a period where pulse PA is at H level, i.e., a period where the N-channel FET 122 is ON, is necessarily within a period where pulse PB is at H level, i.e., a period where the P-channel FET 125 is OFF. Therefore, the N-channel FET 122 and the P-channel FET 125 are never ON at the same time. A circuit operation of such a conventional step-up converter is described below.

When pulse PA is at H level and the N-channel FET 122 is ON, input voltage Vi is applied to the inductor 121. This applied voltage Vi excites the inductor 121.

Then, when pulse PA transitions to L level so that the N-channel FET 122 is turned OFF, energy accumulated in the inductor 121 is discharged through the diode 123 in the form of a current for charging the output capacitor 124. After a very short delay period, pulse PB transitions from H level to L level so that the P-channel FET 125 is turned ON. Accordingly, a current from the inductor 121 flows through the P-channel FET 125.

Then, when pulse PB transitions to H level, the P-channel FET 125 is turned OFF so that energy accumulated in the inductor 121 is again discharged through the diode 123 to the output side. After a very short delay period, pulse PA transitions to H level so that the N-channel FET 122 is turned ON. Accordingly, voltage Vi is applied to the inductor 121 so that voltage Vi excites the inductor 121. By repeating the operation described hereinabove, input voltage Vi is converted to output voltage Vo, whereby power is transferred to the output side.

The control circuit 126 controls the ON/OFF period ratio of the N-channel FET 122 by controlling the pulse widths of pulses PA and PB. With this, the amount of energy accumulated in the inductor 121 and the amount of energy discharged from the inductor 121 are adjusted such that output voltage Vo is controlled to equal a desired value. Herein, the ON resistance of the P-channel FET 125 is sufficiently small, and a voltage drop caused by a current which flows when the P-channel FET 125 is ON is smaller than the forward voltage of the diode 123. Therefore, the power loss caused by rectification is reduced, and the power conversion efficiency of the step-up converter is improved. Although the P-channel FET 125 and the diode 123 are in parallel to each other in FIG. 6, the body diode of the P-channel FET 125 can substitute for the diode 123.

Japanese Laid-Open Patent Publication No. 10-225104 discloses a technique wherein a voltage detection circuit is provided for detecting whether or not output voltage Vo has sufficiently increased and, when output voltage Vo has not sufficiently increased, the operation of the P-channel FET 125 is stopped.

As described above, when a switching element like the P-channel FET 125 is used as a rectifier, the power loss caused by rectification is reduced, and the power conversion efficiency of the step-up converter is improved. However, when the switching element is ON, a current can flow in both directions. Therefore, in order to drive the switching element to perform a rectification function, in general, the switching element is turned OFF when a reverse current flows from the output side to the input side. Hereinafter, a switching element which is used as a rectifier, e.g., the P-channel FET 125, is referred to as a rectification switch.

A driving circuit for driving a rectifier switch which prevents a reverse current is disclosed in Japanese Laid-Open PCT National Phase Publication No. 60-502135. FIG. 7 shows a simplified version of the driving circuit shown in FIG. 2 of Japanese Laid-Open PCT National Phase Publication No. 60-502135.

In the driving circuit shown in FIG. 7, the voltage difference at both ends of a rectification switch 130 formed by a P-channel FET is sensed by a comparator 131, and the output of the comparator 131 is supplied to the gate electrode of the rectification switch 130.

When a current flows in the forward direction from the input side to the output side as indicated by an arrow in FIG. 7, a voltage drop occurs in the rectification switch 130 so that the output of the comparator 131 transitions to L level, whereby the rectification switch 130 is turned ON. A voltage drop due to the ON resistance of the rectification switch 130 maintains the output of the comparator 131 at L level. Therefore, the rectification switch 130 is kept ON so long as the current flows in the forward direction. However, when the forward current of the rectification switch 130 decreases below zero, the voltage drop due to the ON resistance becomes negative so that the output of the comparator 131 is inverted to H level. As a result, the rectification switch 130 is turned OFF. Thus, the driving circuit turns the rectification switch 130 ON only when the current flows in the forward direction, thereby preventing a reverse current from flowing through the rectification switch 130.

SUMMARY OF THE INVENTION

In a general power supply circuit, when the output voltage is increased due to an abrupt decrease of a load current, or the like, transient response of the increased output voltage to a desired value necessarily depends on the time constant for the release of charges from an output capacitor to a load. This also applies to a case where a reverse current is prevented from flowing through the rectification switch. If, on the other hand, a reverse current is allowed to flow through the rectification switch, charges of the output capacitor are smoothly discharged through the rectification switch and, therefore, the output voltage quickly returns to the desired value. However, when the reverse current flows, the rectification switch causes a conduction loss. Therefore, if the reverse current flows without limitation, there would be a possibility that the power efficiency of the step-up converter decreases.

The present invention was conceived in view of the above problems. An objective of the present invention is to provide a step-up converter which uses a switch as a rectifier wherein response to an abrupt decrease of a load current is improved and an increase in power consumption is suppressed.

A step-up converter of the present invention is a step-up converter for generating an output voltage that is greater than an input voltage, comprising: an inductor receiving the input voltage at one end; a main switch connected to the other end of the inductor for allowing/interrupting the passage of a current from the inductor; a rectification switch connected to the other end of the inductor for rectifying a current output from the other end of the inductor; a smoother connected to the other end of the inductor through the rectification switch; and a current detection circuit for detecting a current flowing from the inductor to the main switch irrespective of whether a value of the current is positive or negative to output a current detection signal.

The current detection circuit can detect a current flowing from the inductor to the main switch not only when the current flows in the forward direction but also when the current flows in the reverse direction (direction from the main switch to the inductor). Therefore, even if the output voltage deviates from a desired value, the output voltage can be quickly recovered to the desired value by causing a current to flow through the inductor in the reverse direction (direction from the output side to the input side).

Such an adjustment of the output voltage is carried out by shortening or prolonging a period where the main switch is ON. Therefore, preferably, the step-up converter further includes a control circuit for controlling the operations of the main switch and the rectification switch based on the current detection signal and the output voltage. The control circuit controls the operations such that the main switch and the rectification switch are prevented from being ON at the same time.

In the case where the main switch is an N-channel FET, to detect a current flowing through the main switch during a period where the main switch is ON, another N-channel FET whose gate electrode is connected of the FET which constitutes the main switch is used wherein the source voltage and the drain voltage are equal to each other. With this, the current flowing through the main switch can be accurately mirrored. Further, a differential amplifier and a still another N-channel FET which receives the output of the differential amplifier are provided, whereby the accuracy of the current detection is improved.

DESCRIPTION OF THE PREFERRED EMBODIMENTS

Hereinafter, a step-up converter of the present invention will be described with reference to the drawings.

Embodiment 1

Figure 1:
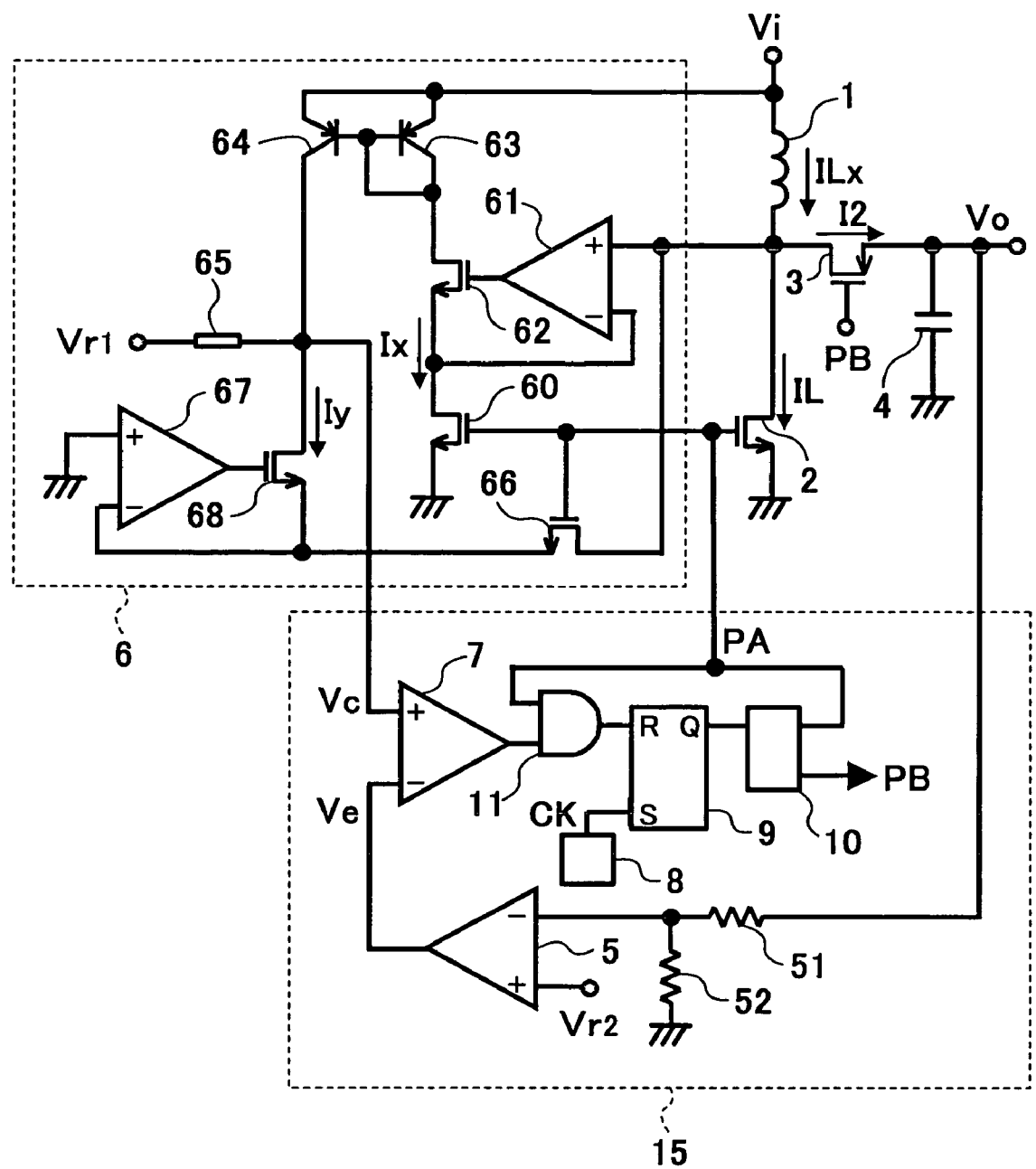
FIG. 1 is a circuit diagram showing a structure of a step-up converter according to embodiment 1 of the present invention.

FIG. 1 is a circuit diagram showing a structure of a step-up converter according to embodiment 1 of the present invention. The step-up converter of embodiment 1 receives DC input voltage Vi from a power supply, such as a battery, or the like, and supplies DC output voltage Vo which has been boosted so as to comply with a device, such as a light emitting device, liquid crystal display device, or the like.

Circuit Structure of Step-Up Converter

Referring to FIG. 1, the step-up converter of embodiment 1 includes an inductor 1, a first N-channel FET (main switch) 2 which serves as a switch, a P-channel FET (rectification switch) 3, an output capacitor (smoother) 4, a current detection circuit 6, and a feed-back control circuit (control circuit) 15. The inductor 1 receives input voltage Vi at one end. The first N-channel FET 2 has a source connected to the ground and a drain connected to the other end of the inductor 1. The P-channel FET 3 rectifies a current output from the other end of the inductor 1. One end of the output capacitor 4 is connected to the source of the P-channel FET 3, and the other end of the output capacitor 4 is connected to the ground. The current detection circuit 6 detects a current flowing through the first N-channel FET 2 to output current detection signal Vc. The feed-back control circuit 15 receives output voltage Vo, second reference voltage Vr2 and current detection signal Vc to control the operations of the first N-channel FET 2 and the P-channel FET 3. Herein, although not shown in FIG. 1, the P-channel FET 3 has a PNP body diode. In an equivalent circuit, this body diode is between the inductor 1 and the output capacitor 4 and is parallel to the P-channel FET 3. In the step-up converter of embodiment 1, energy is accumulated in the inductor 1 during a period where the first N-channel FET 2 is ON. During a period where the first N-channel FET 2 is OFF, the energy accumulated in the inductor 1 is supplied in the form of a current to the load side through the P-channel FET 3 or the body diode thereof.

A feature of the step-up converter of embodiment 1 is the current detection circuit 6 which is capable of detecting current IL flowing through the first N-channel FET 2 not only in the case of "positive" (forward direction) but also in the case of "negative" (reverse direction). The feed-back control circuit 15 controls output voltage Vo using a detection result of the current detection circuit 6 and output voltage Vo such that output voltage Vo is within a desired voltage range.

The current detection circuit 6 includes a first PNP transistor 63, a second PNP transistor 64, a first differential amplifier 61, a second N-channel FET 62, and a third N-channel FET (first auxiliary switch) 60. The bases of the first PNP transistor 63 and second PNP transistor 64 are coupled together, and the emitters of the first PNP transistor 63 and second PNP transistor 64 are also coupled together. The first PNP transistor 63 and second PNP transistor 64 receive input voltage Vi. The first differential amplifier 61 has a positive (+) input terminal connected to the other end of the inductor 1 (end of the output side), the drain of the P-channel FET 3, and the drain of the first N-channel FET 2. The gate electrode of the second N-channel FET 62 is connected to the output terminal of the first differential amplifier 61. The drain of the second N-channel FET 62 is connected to the collector and base of the first PNP transistor 63 and the base of the second PNP transistor 64. The drain of the third N-channel FET 60 is connected to the source of the second N-channel FET 62 and the negative (−) input terminal of the first differential amplifier 61. The source of the third N-channel FET 60 is connected to the ground. The gate electrode of the third N-channel FET 60 is connected to the first N-channel FET 2. The base and collector of the first PNP transistor 63 are connected together.

The current detection circuit 6 further includes a fourth N-channel FET 68, a first resistor 65, a second differential amplifier 67, and a fifth N-channel FET (second auxiliary switch) 66. The drain of the fourth N-channel FET 68 is connected to the collector of the second PNP transistor 64. The first resistor 65 receives first reference voltage Vr1 at one end. The second differential amplifier 67 has a positive (+) input terminal connected to the ground and a negative (−) input terminal connected to the source of the fourth N-channel FET 68. The source of the fifth N-channel FET 66 is connected to the source of the fourth N-channel FET 68 and the negative (−) input terminal of the second differential amplifier 67. The gate electrode of the fifth N-channel FET 66 is connected to the gate electrodes of the first N-channel FET 2 and third N-channel FET 60. The drain of the fifth N-channel FET 66 is connected to the positive (+) input terminal of the first differential amplifier 61, the other end of the inductor 1 (output side end), the drain of the first N-channel FET 2, and the drain of the P-channel FET 3. The first PNP transistor 63 and the second PNP transistor 64 serve as current mirrors for mirroring current Ix flowing through the second N-channel FET 62 and the third N-channel FET 60 when the first N-channel FET 2 is ON. It should be noted that, when current IL has a negative value, current Iy flowing through the fourth N-channel FET 68 as shown in FIG. 1 has a current value proportional to the absolute value of current IL as will be described later (see FIG. 2).

The feed-back control circuit 15 includes a second resistor 51, a third resistor 52, an error amplifier 5, a comparator 7, an AND circuit 11, a clock generation circuit 8, a RS latch 9, and a driving circuit 10. The second resistor 51 receives output voltage Vo at one end. One end of the third resistor 52 is connected to the ground, and the other end of the third resistor 52 is connected to the other end of the second resistor 51. The error amplifier 5 has a positive (+) input terminal which receives second reference voltage Vr2 and a negative (−) input terminal connected between the second resistor 51 and the third resistor 52. The comparator 7 has a positive (+) input terminal which receives current detection signal Vc output from the current detection circuit 6 and a negative (−) input terminal which receives error signal Ve output from the error amplifier 5. The AND circuit 11 receives the output of the comparator 7. The clock generation circuit 8 generates clock signal CK with a predetermined period. The RS latch 9 is reset by the output of the AND circuit 11 and is set by clock signal CK. The driving circuit 10 receives the output of the RS latch 9 and supplies pulse PA to the gate electrodes of the first N-channel FET 2, the third N-channel FET 60 and the fifth N-channel FET 66 and an input terminal of the AND circuit 11 and supplies pulse PB to the gate electrode of the P-channel FET 3. Current detection signal Vc, which is output from the current detection circuit 6 to the comparator 7, is a voltage at the connection point of the other end of the first resistor 65, the collector of the second PNP transistor 64 and the drain of the fourth N-channel FET 68. The driving circuit 10 outputs pulse PA for controlling the operation of the first N-channel FET (main switch) 2 and pulse PB for controlling the operation of the P-channel FET (rectification switch) 3. It should be noted that first reference voltage Vr1 and second reference voltage Vr2 may be the same voltage or may be different voltages from each other.

Figure 2:
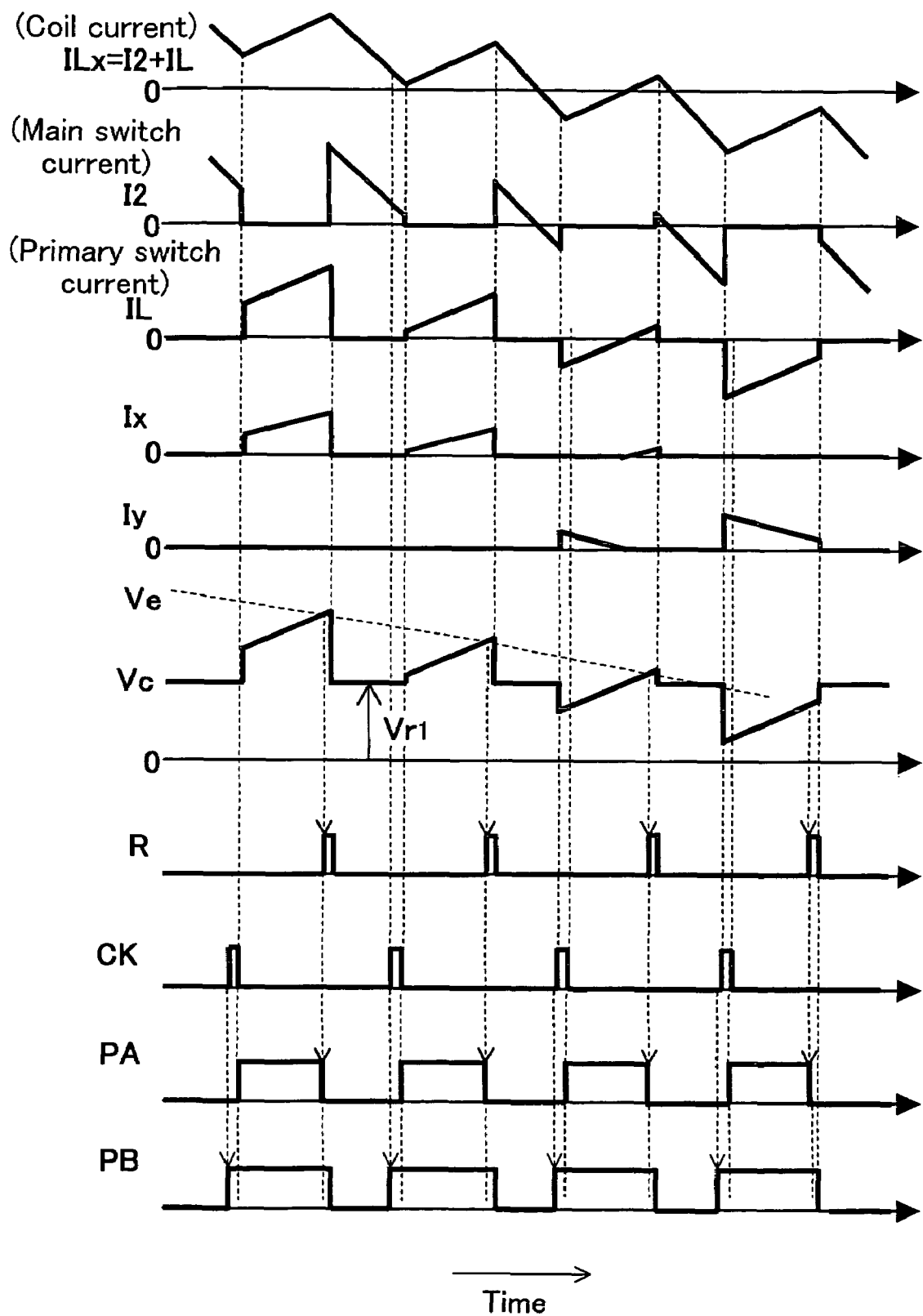
FIG. 2 is a timing chart illustrating the waveforms of signals and currents at respective parts of the step-up converter of embodiment 1.

FIG. 2 is a timing chart illustrating the waveforms of signals and currents at respective parts of the step-up converter of embodiment 1. As shown in FIG. 2, pulse PA and pulse PB are in synchronization with the output of the RS latch 9. For example, pulse PB transitions from L level to H level in response to the rising of clock signal CK, and pulse PA transitions from H level to L level in response to the rising of the output of the AND circuit 11 (the waveform at reset terminal R in FIG. 2). To prevent the first N-channel FET 2 and the P-channel FET 3 from being ON at the same time, pulse PA rises after the rising of pulse PB, and pulse PB falls after the fall of pulse PA.

Operation of Step-Up Converter

Next, an operation of the step-up converter of embodiment 1 shown in FIG. 1 is described with reference to FIG. 2.

First, during a period where pulse PA is at H level and the first N-channel FET 2 is ON, input voltage Vi is applied to the inductor 1 so that applied voltage Vi excites the inductor 1. Herein, to prevent a large current from flowing in the step-up converter, the period where pulse PA is at H level has a length such that energy accumulated in the inductor 1 does not saturate. In FIG. 1, a current flowing through the inductor 1 in the forward direction (from the input side to the output side) is referred to as current ILx. Current ILx is the sum of current IL which flows through the first N-channel FET 2 and current I2 which flows through the P-channel FET 3 to the output side.

Then, L level pulse PA transitions to L level so that the first N-channel FET 2 is turned OFF, whereby the energy accumulated in the inductor 1 is discharged through the body diode of the P-channel FET 3 in the form of a current for charging the output capacitor 4. Then, after the passage of a very short delay period, pulse PB transitions from H level to L level so that the P-channel FET 3 is turned ON, whereby a current flows from the inductor 1 through the P-channel FET 3 to the output capacitor 4 and to a load connected to the step-up converter.

Then, pulse PB transitions to H level. During a period where pulse PB is at H level, the P-channel FET 3 is OFF, so that the energy accumulated in the inductor 1 is again discharged through the body diode of the P-channel FET 3 to the output side. After the passage of a very short delay period, pulse PA transitions to H level so that the first N-channel FET 2 is turned ON. Accordingly, input voltage Vi is applied to the inductor 1 so that applied voltage Vi excites the inductor 1. By repeating the operation described hereinabove, input voltage Vi is converted to output voltage Vo which is greater than voltage Vi, whereby power is transferred to the output side.

Then, control of the first N-channel FET 2 and the P-channel FET 3 by the feed-back control circuit 15 is described.

Output voltage Vo is divided by the second resistor 51 and the third resistor 52. The divided voltage is input to the negative (−) input terminal of the error amplifier 5. The error amplifier 5 amplifies the voltage difference between the divided voltage and second reference voltage Vr2 to output error signal Ve. During a period where pulse PA is at H level and the first N-channel FET 2 is ON, a current flowing from the inductor 1 to the first N-channel FET 2 is detected by the current detection circuit 6.

As the period where the first N-channel FET 2 is ON passes, the current flowing through the first N-channel FET 2 increases and, accordingly, current detection signal Vc rises. When current detection signal Vc exceeds error signal Ve, the output of the comparator 7 is inverted from L level to H level. As a result, the output of the AND circuit 11 transitions to H level (see waveform "R" in FIG. 2) so that the RS latch 9 is reset and its output transitions to L level. In response to the inversion of the output of the RS latch 9 from H level to L level, the driving circuit 10 changes pulse PA to L level so that the first N-channel FET 2 is turned OFF. Then, after the passage of a very short delay period, the driving circuit 10 changes pulse PB to L level so that the P-channel FET 3 is turned ON. The timing of turning the P-channel FET 3 OFF is the time when the RS latch 9 is set again in response to the rising of clock signal CK so that pulse PB transitions to H level. After this very short period, pulse PA transitions to H level so that the first N-channel FET 2 is turned ON.

As described above, when error signal Ve exceeds current detection signal Vc during a period where the first N-channel FET 2 is ON, the feed-back control circuit 15 controls the first N-channel FET 2 to be turned OFF. Although FIG. 2 shows an example where the output of the AND circuit 11 which is applied to the reset terminal R of the RS latch 9 rises at a substantially constant interval, the interval for the rising of the output of the AND circuit 11 changes according to error signal Ve and current detection signal Vc.

Next, the relationship between the feed-back control circuit 15 and output voltage Vo is described in more detail.

Error signal Ve falls when output voltage Vo exceeds a desired value, but error signal Ve rises when output voltage Vo falls below the desired value. The desired value is $(1+R1/R2) \times Vr2$ where R1 and R2 are the resistance values of the second resistor 51 and the third resistor 52, respectively. When output voltage Vo falls below the desired value so that error signal Ve rises, the value of current detection signal Vc, which represents the peak value of current IL flowing from the inductor 1 to the first N-channel FET 2, increases to a high level. Accordingly, the period where the first N-channel FET 2 is ON becomes long. Therefore, the energy accumulated in the inductor 1 increases. As a result, the amount of power supplied to the output side is increased so that output voltage Vo is increased.

Conversely, when output voltage Vo exceeds the desired value so that error signal Ve falls, the value of current detection signal Vc, which represents the peak value of current IL flowing from the inductor 1 to the first N-channel FET 2, decreases. Accordingly, the period where the first N-channel FET 2 is ON becomes short. Therefore, the energy accumulated in the inductor 1 decreases. As a result, the amount of power supplied to the output side is decreased so that output voltage Vo is decreased. With such an operation, the value of output voltage Vo is stabilized at $(1+R1/R2) \times Vr2$. Further, even if an abrupt change in load causes output voltage Vo to deviate from the desired value, output voltage Vo is controlled to quickly return to the desired value.

Next, an operation of the current detection circuit 6 which is a feature of the step-up converter of embodiment 1 is described.

During a period where the first N-channel FET 2 is ON and current IL flows from the inductor 1 to the first N-channel FET 2 (IL≧0), the third N-channel FET 60 is also ON so that current Ix flows therethrough. The first differential amplifier 61 receives the drain voltage of the first N-channel FET 2 and the drain voltage of the third N-channel FET 60. The first differential amplifier 61 controls the second N-channel FET 62 such that the drain voltage of the first N-channel FET 2 and the drain voltage of the third N-channel FET 60 are equal to each other, thereby adjusting current Ix. Further, the source voltage of the first N-channel FET 2 and the source voltage of the third N-channel FET 60 are also equal to each other. Thus, where the ON resistance of the third N-channel FET 60 is N times the ON resistance of the first N-channel FET 2, Ix=IL/N. Current Ix flows to the first resistor 65 through the first PNP transistor 63 and the second PNP transistor 64 which constitute current mirrors. Current detection signal Vc is expressed by the following formula with a condition of IL≧0 because current Ix does not flow in the reverse direction (Ix≧0):

$$Vc=Vr1+Rs \times IL/N (IL \geq 0)$$

where Rs is the resistance value of the first resistor 65.

During a period where the first N-channel FET 2 is ON and current IL flows from the first N-channel FET 2 to the inductor 1 (IL≦0), the fifth N-channel FET 66 is also ON so that current Iy flows therethrough. The second differential amplifier 67 receives the source voltage of the first N-channel FET 2 (ground potential) and the source voltage of the fifth N-channel FET 66. The second differential amplifier 67 controls the fourth N-channel FET 68 such that the source voltage of the first N-channel FET 2 and the source voltage of the fifth N-channel FET 66 are equal to each other, thereby adjusting current Iy. Thus, where the ON resistance of the fifth N-channel FET 66 is N times the ON resistance of the first N-channel FET 2, Iy=−IL/N. Since current Iy flows to the first resistor 65, current detection signal Vc is expressed by the following formula with a condition of IL≦0 because current Iy does not flow in the reverse direction (Iy≧0):

$$Vc=Vr1+Rs \times IL/N (IL \leq 0).$$

In view of the above, current detection signal Vc is expressed by the following formula irrespective of whether current IL flowing through the first N-channel FET 2 is positive or negative:

$$Vc=Vr1+Rs \times IL/N.$$

Thus, current IL is detectable even when the inductor current decreases below zero, and the main switch and the rectification switch are controllable using the detection result. In the process of detecting current IL, the first resistor 65, to which first reference voltage Vr1 is connected, functions as a converter for converting current Ix and current Iy, which are used for detecting current IL, to current detection signal Vc.

As described above, first reference voltage Vr1 may be equal to second reference voltage Vr2. Since the current detection circuit 6 of embodiment 1 includes FETs (the second N-channel FET 62 and the fourth N-channel FET 68) which receive the outputs of the differential amplifiers at the gate electrodes and are connected to the mirror transistors, current IL is detectable with high accuracy.

FIG. 2 shows an example where Vr1 and Vr2 are equal and error signal Ve changes from a value higher than current detection signal Vc to a value lower than current detection signal Vc. In this case, the threshold value of current IL for turning the first N-channel FET 2 OFF changes from positive to negative. It should be noted that, during the OFF period of the first N-channel FET 2, the comparator 7 outputs H level when error signal Ve is lower than reference voltage Vr1. However, the RS latch 9 is not reset because the output of the AND circuit 11 is L level.

As described above, in the step-up converter of embodiment 1, even when the peak value of current IL which flows from the inductor 1 to the first N-channel FET 2 is negative, the control can be carried out in the same way as in the case where the peak value of current IL is positive. Specifically, when current IL is negative, the P-channel FET 3 is ON during a period where pulse PB is at L level. Since Vi<Vo, a current flows through the inductor 1 in the direction from the output side to the input side. When current IL is negative, the body diode of the P-channel FET 3 is reversely biased, and therefore, a current never flows in the reverse direction (from the output side to the input side). As a result, as shown in FIG. 2, during a period where the first N-channel FET 2 and the P-channel FET 3 are OFF, a current flows to the inductor 1 through the body diode of the first N-channel FET 2.

With the above-described control, the operation of allowing a current to continuously flow through the inductor 1 is maintained even if the output current of the step-up converter is zero or lower. Even when an abrupt decrease of a current flowing to a load causes an increase in output voltage Vo, output voltage Vo can be quickly decreased to a desired value by reversing current ILx which flows through the inductor 1, i.e., by regenerating the power from output to input. Thus, in an application where the step-up converter of embodiment 1 is used in a light emitting device for a liquid crystal display device, LED, or the like, output voltage Vo can be quickly recovered to a desired value from a state of overshoot or undershoot which can occur at the start up of the device.

In the step-up converter of embodiment 1, the reverse current is prevented from being excessively large by putting a lower limit on error signal Ve or by separately putting a lower threshold on current detection signal Vc.

It should be noted that the structure of the step-up converter of embodiment 1 is also applicable to a PWM-controlled overcurrent protection circuit.

The first N-channel FET 2 which functions as the main switch of the step-up converter and the third N-channel FET 60 which constitutes a current mirror both may be replaced by NPN bipolar transistors. It should be noted, however, that the structure of FIG. 1 incurs smaller power consumption and is therefore preferable because base currents flow through the bipolar transistors.

Although the current detection circuit 6 of embodiment 1 includes the first differential amplifier 61 and the second N-channel FET 62 as a compensation circuit for adjusting current Ix to current IL with high accuracy, an alternative circuit capable of modifying the drain voltage of the third N-channel FET 60 to be equal to the drain voltage of the first N-channel FET 2 may be adopted. Likewise, although the current detection circuit 6 of embodiment 1 includes the second differential amplifier 67 and the fourth N-channel FET 68 as a compensation circuit for adjusting current Iy to current IL with high accuracy, an alternative circuit capable of modifying the source voltage of the fifth N-channel FET 66 to be equal to the source voltage of the first N-channel FET 2 may be adopted.

Figure 3:
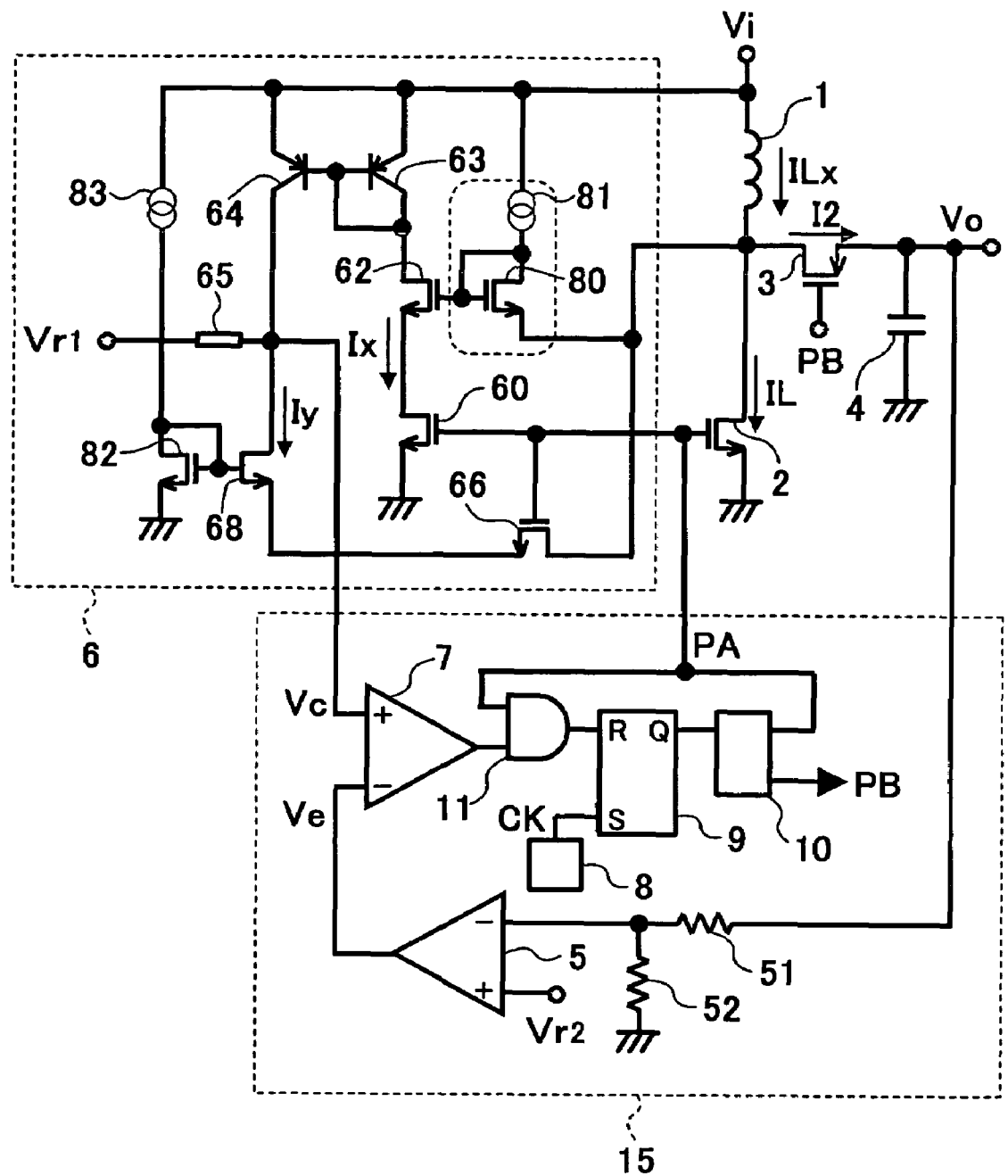
FIG. 3 is a circuit diagram showing a structure of a variation of the step-up converter of embodiment 1.

FIG. 3 is a circuit diagram showing a structure of a variation of the step-up converter of embodiment 1. Current IL is detectable even if the first differential amplifier 61 and the second differential amplifier 67 of the step-up converter of FIG. 1 are replaced by a sixth N-channel FET 80 and a seventh N-channel FET 82, respectively, as shown in FIG. 3. In this case, a first current source 81 which is connected to the drain of the sixth N-channel FET 80 and a second current source 83 which is connected to the drain of the seventh N-channel FET 82 are further provided. It should be noted that the structure of FIG. 1 is more preferably because the detection accuracy is higher than that of the variation of FIG. 3.

In the step-up converter of embodiment 1, the second N-channel FET 62 and the fourth N-channel FET 68 which are connected to the outputs of the first differential amplifier 61 and the second differential amplifier 67, respectively, may be replaced by NPN bipolar transistors.

Embodiment 2

Figure 4A:
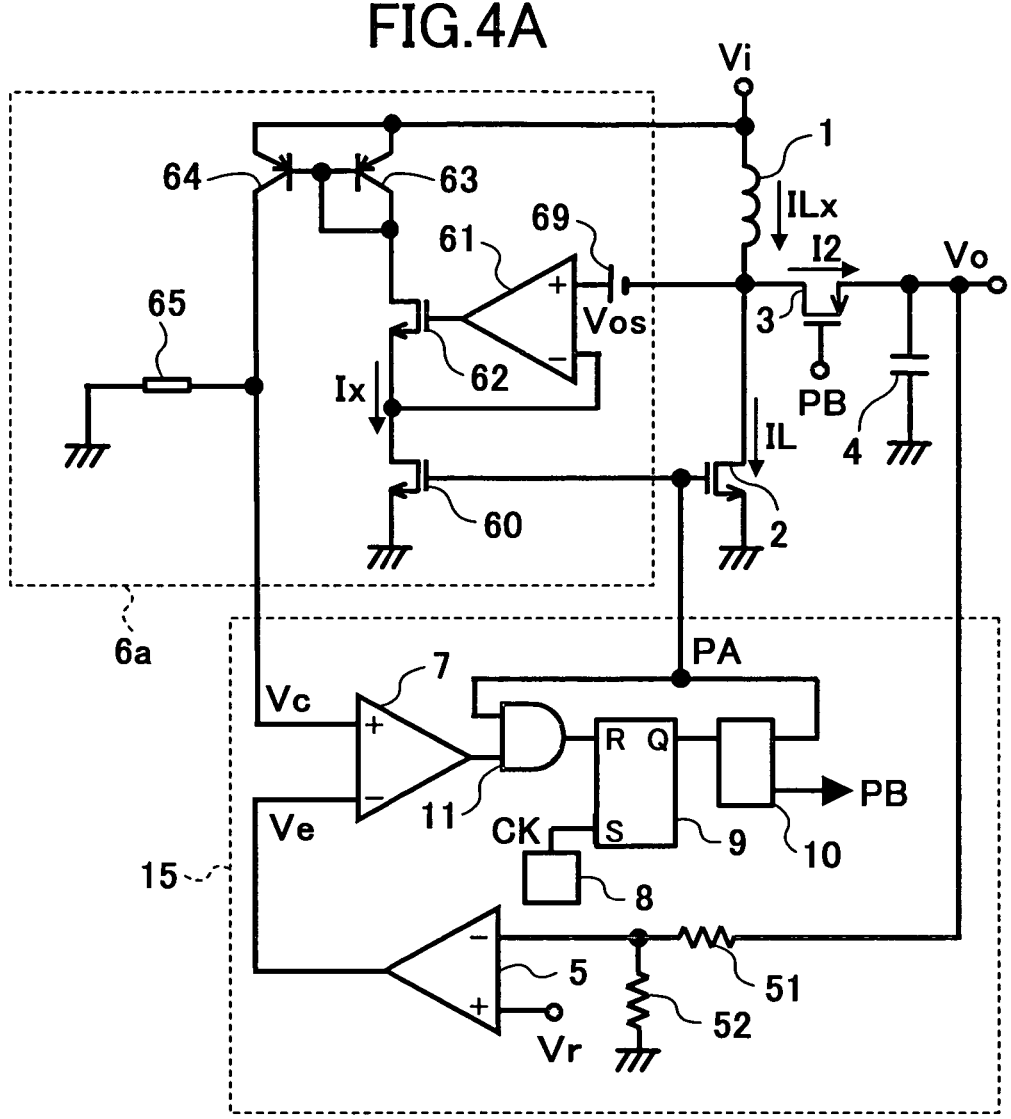
FIG. 4A is a circuit diagram showing a structure of a step-up converter according to embodiment 2 of the present invention.
Figure 4B:
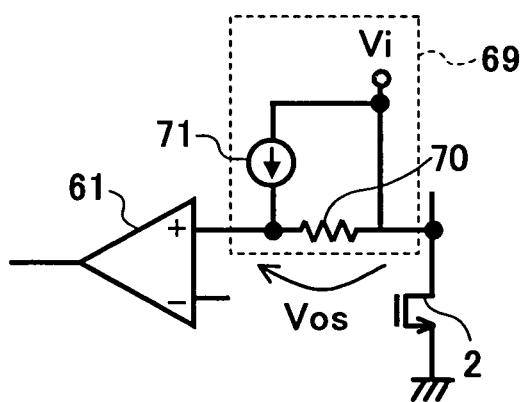
FIG. 4B is a circuit diagram showing a specific structure example of an offset voltage source shown in FIG. 4A.
Figure 4C:
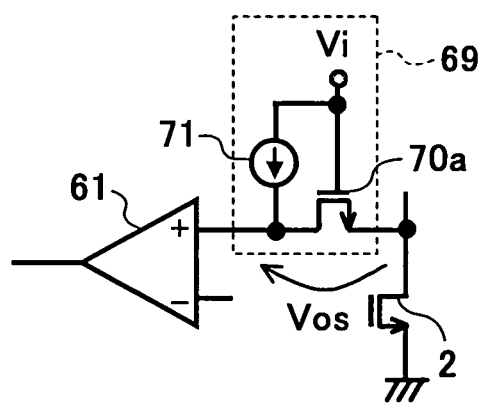
FIG. 4C is a circuit diagram showing specific structure example of the offset voltage source shown in FIG. 4B.

FIG. 4A is a circuit diagram showing a structure of a step-up converter according to embodiment 2 of the present invention. FIG. 4B is a circuit diagram showing a specific structure example of an offset voltage source shown in FIG. 4A. FIG. 4C is a circuit diagram showing a specific structure example of the offset voltage source shown in FIG. 4B. In FIG. 4A, the same elements as those of the step-up converter of embodiment 1 of the present invention shown in FIG. 1 are denoted by the same reference numerals used in FIG. 1, and the descriptions thereof are herein omitted. The step-up converter of embodiment 2 is different from the step-up converter of embodiment 1 in the structure of the current detection circuit. Therefore, the current detection circuit of embodiment 2 is referred to as a current detection circuit 6a so as to be distinguishable from the current detection circuit 6 of FIG. 1. Hereinafter, the structure and operation of the current detection circuit 6a are described. In FIG. 4, a current flowing through the inductor 1 in the forward direction (from the input side to the other side) is also referred to as current ILx. Current ILx is the sum of current IL which flows through the first N-channel FET 2 and current I2 which flows through the P-channel FET 3 to the output side.

The current detection circuit 6a includes a first PNP transistor 63, a second PNP transistor 64, an offset voltage source 69, a first differential amplifier 61, a second N-channel FET 62, a third N-channel FET (third auxiliary switch) 60, and a first resistor 65. The bases of the first PNP transistor 63 and second PNP transistor 64 are coupled together, and the emitters of the first PNP transistor 63 and second PNP transistor 64 are also coupled together. The first PNP transistor 63 and second PNP transistor 64 receive input voltage Vi. The negative end of the offset voltage source 69 is connected to the other end of the inductor 1 (output side end), the drain of the P-channel FET 3, and the drain of the first N-channel FET 2. The first differential amplifier 61 has a positive (+) input terminal connected to the positive end of the offset voltage source 69. The gate electrode of the second N-channel FET 62 is connected to the output terminal of the first differential amplifier 61. The drain of the second N-channel FET 62 is connected to the collector and base of the first PNP transistor 63 and the base of the second PNP transistor 64. The drain of the third N-channel FET 60 is connected to the source of the second N-channel FET 62 and the negative (−) input terminal of the first differential amplifier 61. The source and gate electrode of the third N-channel FET 60 is connected to the source and gate electrode of the first N-channel FET 2, respectively. The first resistor 65 has an end connected to the ground and the other end connected to the collector of the second PNP transistor 64 and the positive (+) input terminal of the comparator 7.

The size of the third N-channel FET 60 is a 1/N of the first N-channel FET 2. The ON resistance of the third N-channel FET 60 is N times the ON resistance of the first N-channel FET 2. The voltage at the connection point of the first resistor 65 and the collector of the second PNP transistor 64 is output as current detection signal Vc.

To allow current Ix to flow even if current IL has a negative value, the current detection circuit 6a of embodiment 2 includes the offset voltage source 69 at the positive (+) input terminal of the first differential amplifier 61 in substitution for the omitted second differential amplifier 67 and fourth N-channel FET 68 (see FIG. 1). Therefore, the current detection circuit 6a of embodiment 2 has a simple structure as compared with the current detection circuit 6 of embodiment 1 as will be described later.

Current IL flowing through the first N-channel FET 2 from drain to source generates, at the drain of the first N-channel FET 2, a voltage of IL×Ron where Ron is the ON resistance of the first N-channel FET 2. The sum of this voltage and offset voltage Vos, i.e., Vos+IL×Ron, is applied to the positive (+) input terminal of the first differential amplifier 61. The first differential amplifier 61 controls the second N-channel FET 62 to adjust current Ix which flows from the second N-channel FET 62 to the third N-channel FET 60 such that the voltage applied to the positive (+) input terminal is equal to Vos+IL×Ron. Since the ON resistance of the third N-channel FET 60 is N×Ron, $$Ix \times N \times Ron = Vos + IL \times Ron.$$

Based on this formula, current Ix is expressed by the following formula:

$$Ix = (Vos/Ron + IL)/N$$

Thus, current detection signal Vc output from the current detection circuit 6a is:

$$Vc = Rs \times (Vos/Ron + IL)/N$$

where Rs is the resistance value of the first resistor 65.

Figure 5:
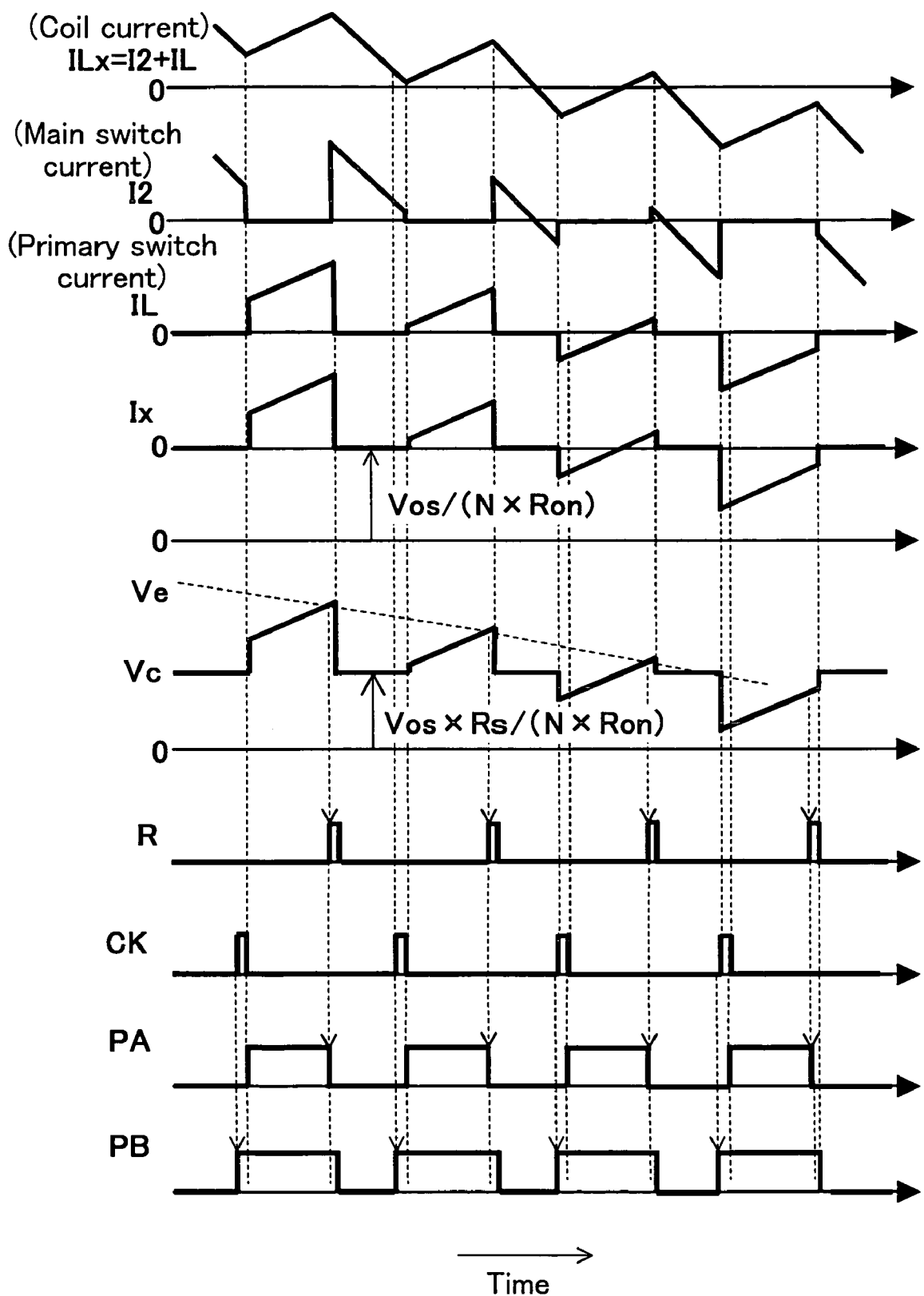
FIG. 5 is a timing chart illustrating the waveforms of signals and currents at respective parts of the step-up converter of embodiment 2.
Figure 6:
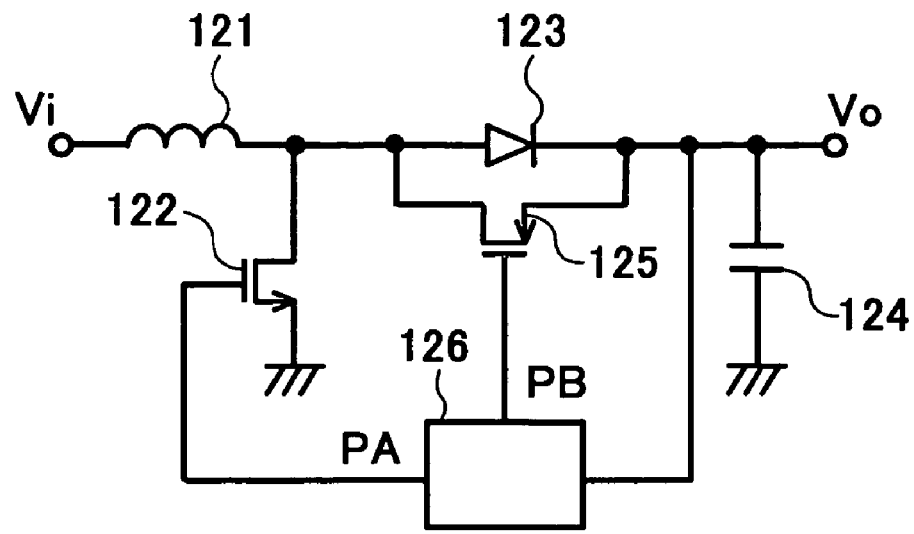
FIG. 6 is a circuit diagram showing a structure of a conventional step-up converter.
Figure 7:
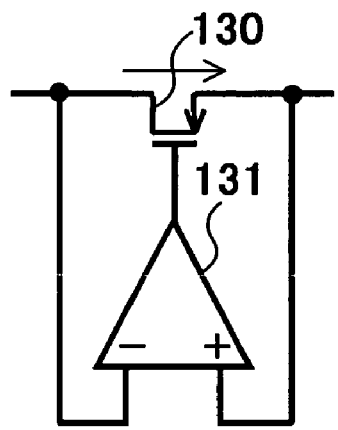
FIG. 7 is a circuit diagram showing a structure of a rectification switch of the conventional step-up converter.

FIG. 5 is a timing chart illustrating the waveforms of signals and currents at respective parts of the step-up converter of embodiment 2 shown in FIG. 4. FIG. 5 illustrates the waveforms of current IL flowing through the first N-channel FET 2, current Ix flowing through the third N-channel FET 60, current detection signal Vc and error signal Ve, reset signal R for the RS latch 9, output CK of the clock generation circuit 8 which is a set signal for the RS latch 9, pulse PA which is a signal for driving the first N-channel FET 2, and pulse PB which is a signal for driving the P-channel FET 3.

As shown in FIG. 5, in the step-up converter of embodiment 2, as error signal Ve changes from a value higher than Vos×Rs/(N×Ron) to a value lower than Vos×Rs/(N×Ron), the threshold of current IL for turning the first N-channel FET 2 OFF changes from positive to negative.

In the current detection circuit 6a of embodiment 2, the control can be carried out even when the peak value of the current which flows through the inductor 1 is negative. With this, a current is allowed to continuously flow through the inductor 1 even if the output current of the step-up converter is zero or lower. Even when an abrupt decrease of a current output to a load causes an increase in output voltage Vo, the output voltage can be quickly decreased to a desired value by reversing the current flowing through the inductor 1 to regenerate the power from the output side to the input side. Especially in the step-up converter of embodiment 2, the current detection circuit 6a has a simple structure as compared with the step-up converter of embodiment 1 and therefore can easily be manufactured. Thus, the production cost can be decreased.

As shown in FIG. 4B, the offset voltage source 69 may be formed by a current source 71 which receives input voltage Vi to output a constant current and a resistor 70 which is in parallel with the current source 71 relative to the positive (+) input terminal of the first differential amplifier 61. Further, as shown in FIG. 4C, an N-channel FET 70a which is ON may be used in place of the resistor 70. In this case, the current source 71 causes a constant current to flow through the N-channel FET 70a, thereby producing an ON resistance. With this, the N-channel FET 70a and the first N-channel FET 2 can be set to have the same variations in the temperature characteristic of the ON resistance and the FET performance. Therefore, the detection accuracy of current IL is improved as compared with the example of using the resistor 70.

INDUSTRIAL APPLICABILITY

A step-up converter of the present invention is useful in generating a voltage greater than the supply voltage received from a battery, or the like, to produce a driving voltage for various devices including light emitting devices, liquid crystal display devices, etc.

What is claimed is:

1. A step-up converter for generating an output voltage that is greater than an input voltage, comprising:
    an inductor receiving the input voltage at one end;
    a main switch connected to the other end of the inductor for allowing/interrupting the passage of a current from the inductor;
    a first switch connected to the other end of the inductor for allowing/interrupting a current output from the other end of the inductor to pass the current in both directions;
    a smoother connected to the other end of the inductor through the first switch; and
    a current detection circuit for detecting a current flowing from the inductor to the main switch irrespective of whether a value of the current is positive or negative to output a current detection signal,
    wherein the current detection circuit includes:
    a first detection circuit for detecting the current flowing from the inductor to the main switch when the value of the current is positive; and
    a second detection circuit for detecting the current flowing from the inductor to the main switch when the value of the current is negative.

2. The step-up converter of claim 1, further comprising a control circuit for controlling operations of the main switch and the first switch based on the current detection signal and the output voltage,
wherein the control circuit controls the operations such that the main switch and the first switch are prevented from being ON at the same time.

3. The step-up converter of claim 1, wherein:
the first detection circuit includes a first auxiliary switch whose one end is connected to the ground and which allows the passage of a current determined according to the current flowing from the inductor to the main switch when a current value of the current flowing from the inductor to the main switch is positive; and
the second detection circuit includes a second auxiliary switch whose one end is connected to the other end of the inductor and which allows the passage of a current determined according to the current flowing from the inductor to the main switch when a current value of the current flowing from the inductor to the main switch is negative.

4. The step-up converter of claim 3, wherein the main switch, the first auxiliary switch, and the second auxiliary are N-channel FETs whose gate electrodes are coupled together.

5. The step-up converter of claim 4, wherein:
the first detection circuit further includes a first compensation circuit for adjusting the current flowing through the first auxiliary switch such that a drain voltage of the main switch which is ON and a drain voltage of the first auxiliary switch which is ON are equal to each other; and
the second detection circuit further includes a second compensation circuit for adjusting the current flowing through the second auxiliary switch such that a source voltage of the main switch which is ON and a source voltage of the second auxiliary switch which is ON are equal to each other.

6. The step-up converter of claim 5, wherein:
the first compensation circuit includes
a first differential amplifier which receives the drain voltage of the main switch and the drain voltage of the first auxiliary switch and
a first N-channel FET having a gate electrode which receives an output of the first differential amplifier and a source connected to the first auxiliary switch; and
the second compensation circuit includes
a second differential amplifier which receives the source voltage of the main switch and the source voltage of the second auxiliary switch and
a second N-channel FET having a gate electrode which receives an output of the second differential amplifier and a source connected to the second auxiliary switch.

7. A step-up converter for generating an output voltage that is greater than an input voltage, comprising:
an inductor receiving the input voltage at one end;
a main switch connected to the other end of the inductor for allowing/interrupting the passage of a current from the inductor;
a first switch connected to the other end of the inductor for allowing/interrupting a current output from the other end of the inductor to pass the current in both directions;
a smoother connected to the other end of the inductor through the first switch; and
a current detection circuit for detecting a current flowing from the inductor to the main switch irrespective of whether a value of the current is positive or negative to output a current detection signal,
wherein the current detection circuit includes a third auxiliary switch whose one end is connected to the ground and which allows the passage of a current determined according to the current flowing from the inductor to the main switch.

8. The step-up converter of claim 7, wherein the main switch and the third auxiliary switch are N-channel FETs whose gate electrodes are coupled together.

9. The step-up converter of claim 8, wherein the current detection circuit further includes a third compensation circuit for adjusting the current flowing through the third auxiliary switch such that a drain voltage of the main switch which is ON and a drain voltage of the third auxiliary switch which is ON are equal to each other.

10. The step-up converter of claim 9, wherein the third compensation circuit includes:
an offset voltage source having a negative electrode connected to a drain of the main switch;
a third differential amplifier having an input section connected to a positive electrode of the offset voltage source and a drain of the third auxiliary switch; and
a third N-channel FET having a gate electrode which receives an output of the third differential amplifier and a source connected to the drain of the third auxiliary switch.

* * * * *